United States Patent
Wang et al.

(10) Patent No.: US 11,223,315 B2
(45) Date of Patent: Jan. 11, 2022

(54) POWER TOOL

(71) Applicant: Nanjing Chervon Industry Co., Ltd., Nanjing (CN)

(72) Inventors: Hongwei Wang, Nanjing (CN); Weipeng Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/872,884

(22) Filed: May 12, 2020

(65) Prior Publication Data

US 2020/0274478 A1 Aug. 27, 2020

Related U.S. Application Data

(63) Continuation of application No. PCT/CN2018/097242, filed on Jul. 26, 2018.

(30) Foreign Application Priority Data

Nov. 24, 2017 (CN) .......................... 201711186707.6

(51) Int. Cl.
*H02K 7/14* (2006.01)
*H02P 29/032* (2016.01)
(Continued)

(52) U.S. Cl.
CPC .......... *H02P 29/032* (2016.02); *B24B 23/028* (2013.01); *H02K 29/08* (2013.01);
(Continued)

(58) Field of Classification Search
CPC .......... H02P 29/032; H02P 6/28; H02P 29/40; H02P 29/08; H02P 6/182; H02P 6/16; H02P 29/02; H02P 29/024; H02P 2203/03
See application file for complete search history.

(56) References Cited

U.S. PATENT DOCUMENTS

| 7,417,389 B2 | 8/2008 | Shaw | |
|---|---|---|---|
| 2013/0082627 A1* | 4/2013 | Ichikawa | H02P 6/00 318/139 |
| 2017/0373614 A1* | 12/2017 | Lewis | H02K 7/145 |

FOREIGN PATENT DOCUMENTS

| CN | 201509176 U | 6/2010 |
|---|---|---|
| CN | 204947947 U | 1/2016 |

(Continued)

OTHER PUBLICATIONS

ISA/CN, Int. Search Report issued on PCT application No. CN2018/097242, dated Oct. 29, 2018, 2 pages.

*Primary Examiner* — Karen Masih

(74) *Attorney, Agent, or Firm* — Greenberg Traurig, LLP

(57) ABSTRACT

A power tool, includes a power supply module for connecting to AC power; a brushless motor including a rotor and a stator winding; a rectifier module configured to receive the AC power from the power supply module and output a DC bus voltage; a position detection module for detecting a position signal of the brushless motor; a MCU chip configured to receive the position signal of the brushless motor detected by the position detection module and output a driving signal according to the position signal, where the MCU chip includes a controller; and a driving circuit configured to receive the driving signal from the MCU chip to drive the brushless motor, where the driving circuit is connected in series between the MCU chip and the stator winding of the brushless motor.

7 Claims, 2 Drawing Sheets

(51) Int. Cl.
  *H02P 6/28*  (2016.01)
  *H02P 29/40* (2016.01)
  *B24B 23/02* (2006.01)
  *H02K 29/08* (2006.01)
  *H02P 6/182* (2016.01)
  *B25F 5/02*  (2006.01)

(52) U.S. Cl.
  CPC ................ *H02P 6/182* (2013.01); *H02P 6/28* (2016.02); *H02P 29/40* (2016.02); *B25F 5/02* (2013.01)

(56) References Cited

FOREIGN PATENT DOCUMENTS

| CN | 106208836 A | 12/2016 |
| CN | 106702620 A | 5/2017 |
| CN | 206640524 U | 11/2017 |

\* cited by examiner

POWER TOOL

RELATED APPLICATION INFORMATION

The present application claims the benefit of and is a continuation of International Application Number PCT/CN2018/097242, filed on Jul. 26, 2018, which application claims the benefit of Chinese Patent Application No. 201711186707.6, filed on Nov. 24, 2017 in the SIPO (State Intellectual Property Office—Chinese Patent Office), the disclosures of which are incorporated herein in their entirety by reference.

TECHNICAL FIELD

The present disclosure relates to the field of power tools, in particular, a power tool with a protection function.

BACKGROUND

A brushless motor becomes increasingly popular in the field of power tool applications, and needs a power device to replace a carbon brush of a brushed motor to achieve commutation. The power tool is complicated in the operating condition and has a large fluctuation of load, which causes the power device to be tested. For example, under conditions such as the locked rotor when cutting with a circular saw and the shovel cutting of an angle grinder, the power device faces the test of being damaged due to abnormalities such as high current impact, over temperature or undervoltage. Therefore, the power tool needs to be protected.

SUMMARY

In order to solve the shortcomings of the related art, an object of the present disclosure is to provide a power tool with a protection function.

In order to achieve this object, an example technical scheme adopted by the present disclosure is found in a power tool, including a power supply module configured for connecting to AC power; a brushless motor including a rotor and a stator winding; a rectifier module configured to receive the AC power from the power supply module and output a DC bus voltage; a position detection module configured for detecting a position signal of the brushless motor; a MCU chip configured to receive the position signal of the brushless motor detected by the position detection module and output a driving signal according to the position signal, where the MCU chip includes a controller; and a driving circuit configured to receive the driving signal from the MCU chip to drive the brushless motor, where the driving circuit is connected in series between the MCU chip and the stator winding of the brushless motor.

In one example, the power tool includes a current detection circuit which is configured for detecting a bus current, where the controller is configured to, in condition that the bus current detected by the current detection circuit is greater than a preset current value, cut off the driving signal output by the MCU chip.

In one example, the current detection circuit includes a current detection unit, a comparator, and a diode. The current detection unit is configured for detecting the bus current; the comparator is configured to, in condition that the bus current detected by the current detection unit is greater than the preset current value, output a high level signal to the diode to conduct the diode; and the controller is configured to, in condition that the controller receives a conduction signal of the diode, cut off outputting of the driving signal.

In one example, the power tool includes a Hall sensor which is configured for detecting a position of the rotor of the brushless motor, where the position detection module is electrically connected to the Hall sensor.

In one example, the position detection module is a back electromotive force detection module, and is configured for detecting a back electromotive force of the brushless motor.

In one example a power tool includes an AC power plug configured for connecting to AC power; a brushless motor including a rotor and a stator winding; a rectifier module, where the rectifier module is electrically connected to the AC power plug, and is configured to convert the AC power input by the AC power plug into DC power for output; a back electromotive force detection module, where the back electromotive force detection module is electrically connected to the stator winding of the brushless motor, and is configured to detect a back electromotive force of the brushless motor; a driving circuit, where the driving circuit is electrically connected to the stator winding of the brushless motor, and is configured to drive the brushless motor, and the driving circuit has a plurality of driving input terminals; and a MCU chip, where the MCU chip is connected between the back electromotive force detection module and the driving circuit, and is configured to output a driving signal to the driving circuit according to the back electromotive force detected by the back electromotive force detection module, and the MCU chip has a plurality of MCU output terminals which are electrically connected to the driving input terminals.

In one example, the power tool includes a current detection circuit which is configured for detecting a bus current, where the MCU chip is configured to, in condition that the bus current detected by the current detection circuit is greater than a preset current value, cut off the driving signal output from the MCU output terminals.

In one example, the power tool includes a current detection circuit, where the current detection circuit includes a current detection unit, a comparator, and a diode. The current detection unit is configured for detecting a bus current. The comparator has a first input terminal, a second input terminal and an output terminal, the first input terminal is electrically connected to the current detection unit to input the bus current, the second input terminal is configured for inputting a preset current value, the output terminal is electrically connected to an anode of the diode, and a cathode of the diode is electrically connected to the MCU chip.

In one example, the output terminal of the comparator is configured to, in condition that the bus current is greater than or equal to the preset current value, output a high level signal to conduct the diode; and the MCU chip is configured to, in condition that the MCU chip receives a conduction signal of the diode, cut off the driving signal output from the MCU output terminal.

In one example, the output terminal of the comparator is configured to, in condition that the bus current is less than the preset current value, output a low level signal to cut off the diode.

The benefits of the present disclosure are as follows: the power tool having a protection function is provided, such that the damage on components and parts of the power tool under severe working conditions may be effectively avoided.

DETAILED DESCRIPTION

The present disclosure is described hereinafter through specific examples in conjunction with the accompanying drawings.

Figure 1:
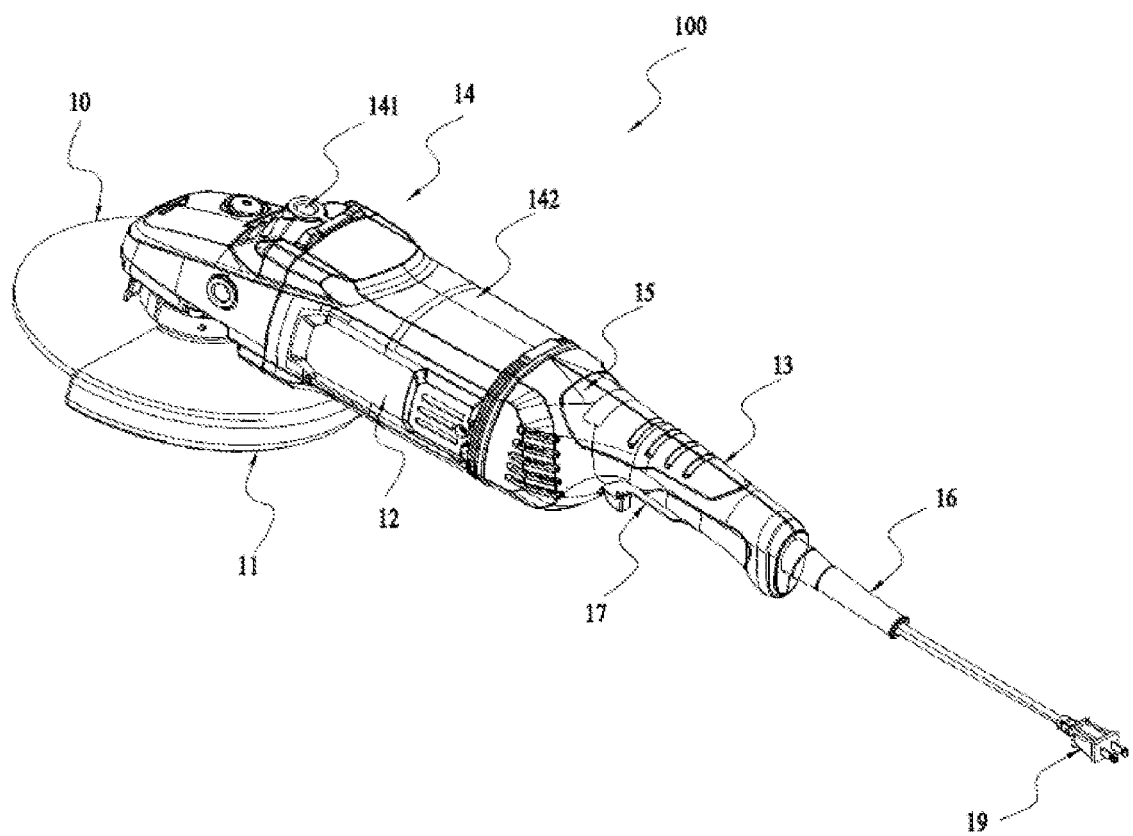
FIG. 1 is a structural diagram illustrating an angle grinder according to an example.

FIG. 1 shows an angle grinder as a power tool according to an example. The angle grinder includes a grinding disc 10, a shield 11, an output shaft, a motor 12, a handle 13, a transmission mechanism, a case 14 and a braking device 15.

The grinding disc 10 is used to achieve a grinding function or a cutting function. The shield 11 partially covers the grinding disc 10 to achieve a protection function. The output shaft is used to mount or fix the grinding disc 10. The motor 12 is used to drive the output shaft to rotate. In one example, the motor includes a motor shaft. The output shaft is connected to the motor shaft through the transmission mechanism such that a driving force of the motor shaft is transmitted to the output shaft. The case 14 is used to mount or fix the motor 12. The handle 13 is for being gripped by a user, and the handle 13 may be an independent part or be formed by the case 14. The case 14 includes a head case 141 and a housing 142. The motor 12 is fixed to the housing 142. The head case 141 is used to mount the transmission mechanism.

A power line 16 is connected to an alternating current (AC) power supply by, for example, an AC power plug 19. The angle grinder 100 further includes an operation switch 17 for turning on or turning off the motor 12. In a case where the operation switch 17 is triggered, the motor 12 is turned on; in a case where the operation switch 17 is released, the motor 12 is turned off. The operation switch 17 is disposed on the handle 13. The braking device 15 is disposed between the handle and the motor, and configured to quickly brake the motor shaft. In a case where the user needs to stop the grinding disc 10 from rotating, the braking device 15 stops the motor 12 in a short time to avoid possible dangers.

It should be understood that the angle grinder is described only as an example herein, and the power tool may be an electric circular saw, a sander, an electric drill and the like.

Figure 2:
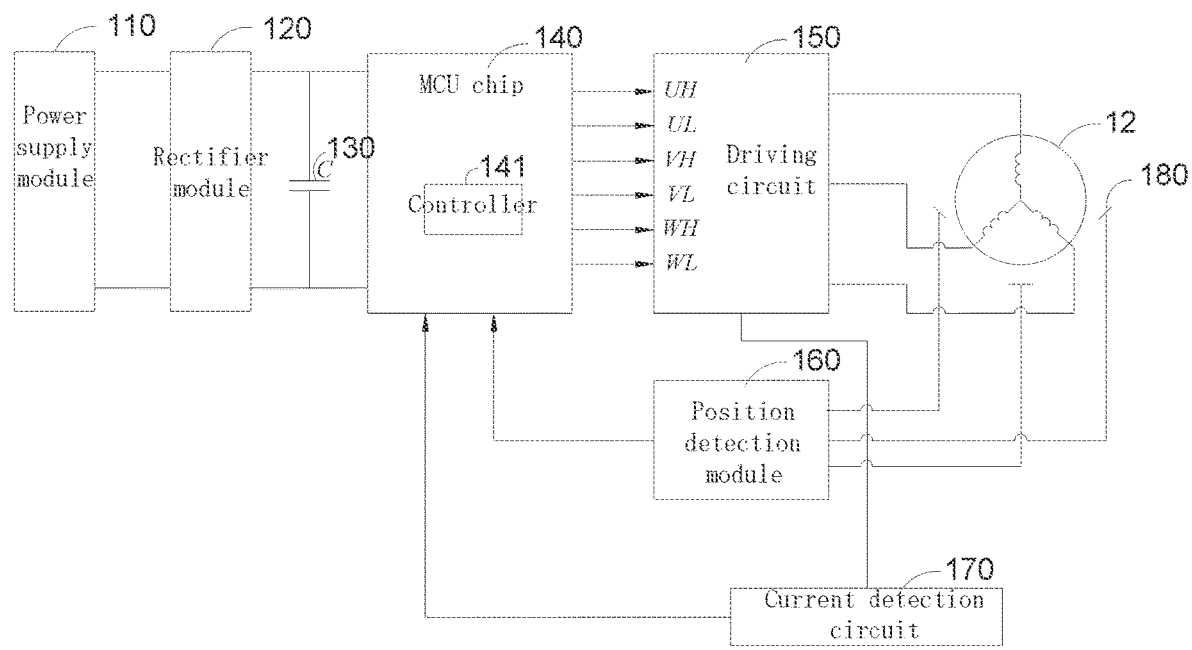
FIG. 2 is a system block diagram illustrating a power tool according to an example.

FIG. 2 shows a system block diagram of the power tool according to an example. The power tool includes a power supply module 110, a rectifier module 120, an electrolytic capacitor 130, a MCU chip 140, a driving circuit 150 and a position detection module 160.

The power supply module 110 is connected to an AC or direct current (DC) power supply required for the motor operation. In one example, the power supply module 110 includes an AC power plug that may be connected to the AC power to access main power with 120 V or 220 V. In another example, the power supply module 110 is connected to the DC power supply required for the power tool, such as a battery pack.

The rectifier module 120 is configured to receive the AC power from the power supply module 110 and output a DC bus voltage, that is, the rectifier module 120 is configured to convert the AC power input from the power supply module 110 into a pulsating DC power to output. The rectifier module 120 is electrically connected to the power supply module 110. In one example, the rectifier module 120 includes a rectifier bridge formed by four diodes 173, and the AC power is converted into pulsating DC power to output in the same direction through the unidirectional conductivity and the tube voltage drop of the diode.

The electrolytic capacitor 130 is electrically connected to the rectifier module 120, and through the electrolytic capacitor 130, the pulsating DC power output by the rectifier module 120 is filtered and converted into a smooth DC power to output, thereby reducing harmonic interference in the pulsating DC power.

The position detection module 160 is electrically connected to the motor, and is used to detect a rotor of the motor and a position signal related to the rotor. Referring to FIG. 2, in one example, the position detection module 160 is electrically connected to a Hall sensor 180, and is used to detect a position of the rotor of the motor. In a case where the rotor is rotated into a preset range within which the rotor can be sensed by the position detection module 160, the position detection module 160 is in one signal state; in a case where the rotor is rotated out of the preset range, the position detection module 160 is switched to another signal state.

In another example, the position detection module 160 is a back electromotive force detection module, and is used to detect a back electromotive force of the motor. In this example, the Hall sensor 180 does not need to be mounted.

The driving circuit 150 is used to drive the motor 12, and the driving circuit 150 is electrically connected to the motor 12. In one example, the motor 12 is a three-phase brushless motor, including a rotor and a stator winding. The driving circuit is electrically connected to three-phase windings of the three-phase brushless motor, respectively.

Figure 3:
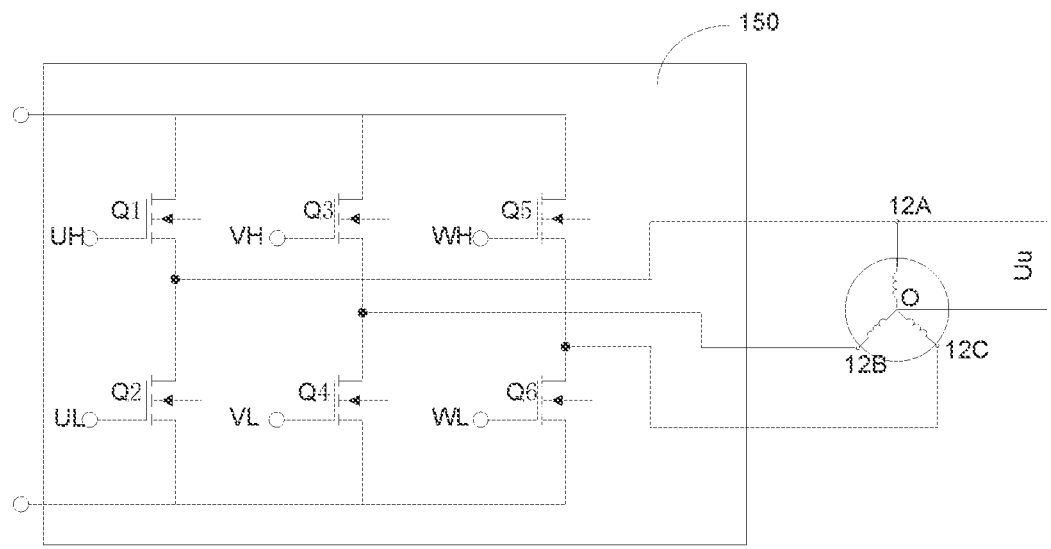
FIG. 3 is a circuit diagram illustrating a driving circuit in FIG. 2.

As shown in FIG. 3, the driving circuit 150 includes switching elements Q1, Q2, Q3, Q4, Q5 and Q6. Gates of the respective switching elements Q1-Q6, i.e., driving input terminals UH, UL, VH, VL, WH, WL of the driving circuit 150, are electrically connected to output terminals of the MCU chip 140 respectively. Drains or sources of the respective switching elements each are connected to the stator winding of the motor. The switching elements Q1-Q6 change a conduction state according to a control signal output by the MCU chip 140, thereby changing a voltage state of the power supply module 160 loading on the winding of the brushless motor.

In order to rotate the brushless motor, the driving circuit 150 has multiple driving states. Under each driving state, the stator winding of the motor generates a respective magnetic field. The MCU chip 140 is configured to output a corresponding control signal to the driving circuit 150 according to a rotation position signal of the motor or a back electromotive force signal of the motor, so as to cause the driving circuit 150 to switch the driving state, so that the magnetic field generated by the stator winding rotates to drive the rotor to rotate, thereby realizing the driving for the brushless motor.

Figure 4:
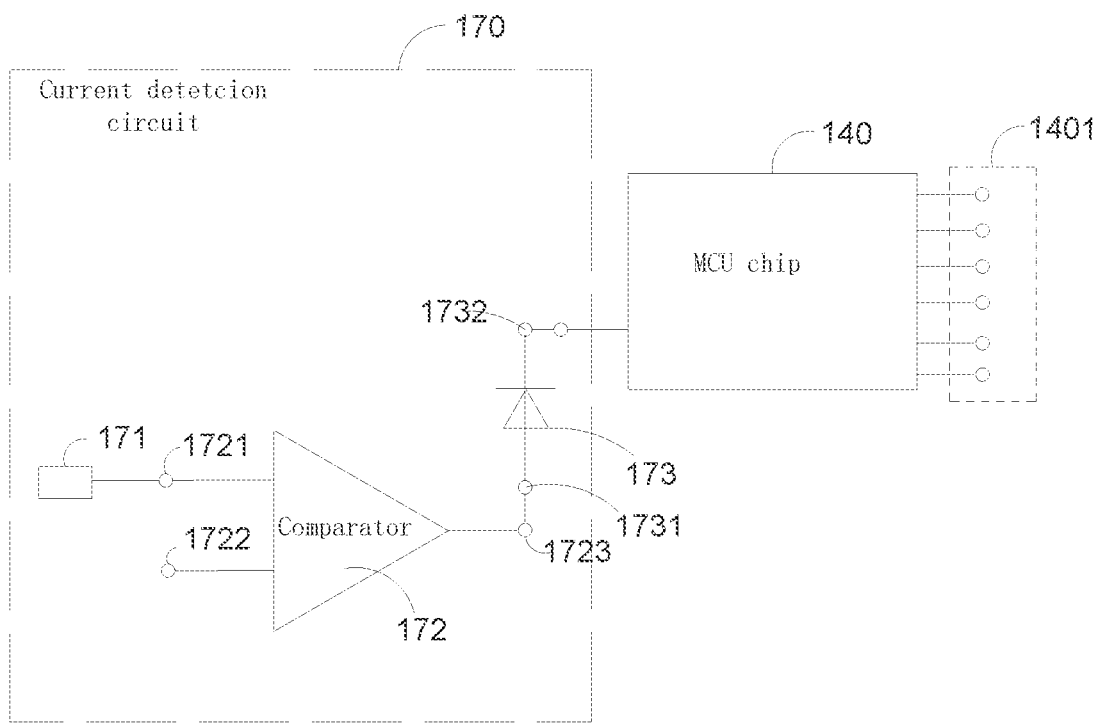
FIG. 4 is a circuit diagram illustrating a current detection circuit in FIG. 2.

Referring to FIG. 3 and FIG. 4, the power tool further includes a current detection circuit 170 for detecting a bus current. The current detection circuit is electrically connected to the MCU chip 140. The MCU chip 140 is configured to cut off a driving signal output by the MCU output terminals in a case where a bus current detected by the current detection circuit 170 is greater than or equal to a preset current value. In this way, in a case where the power tool is under severe working conditions such as the shovel cutting of the angle grinder, the current detection circuit 170 detects the bus current such that the MCU chip 140 is triggered to directly cut off the output of the driving signal from the output terminals of MCU chip 140 when the bus current is greater than or equal to the preset current, namely an output terminal 1401 of the MCU chip 140 does not output the driving signal, thereby protecting the use safety of the switching elements in the driving circuit 150, and avoiding the switching elements from being damaged caused by the passing of the large current. And this manner in which the driving signal of the output terminal 140 of the MCU chip 140 is directly cut off decreases delaying of the driving signal.

Referring to FIG. 4, the current detection circuit 170 includes a current detection unit 171, a comparator 172 and a diode 173. The current detection unit 171 is used to detect the bus current. In one example, the current detection unit 171 is a current sensor or a resistor. The comparator 172 has a first input terminal 1721, a second input terminal 1722 and an output terminal 1723. The first input terminal is electrically connected to the current detection unit 171 to input the detected bus current, the second input terminal is used to input the preset current value, the output terminal 1723 is electrically connected to an anode 1731 of the diode 173, and a cathode 1732 of the diode 173 is electrically connected to the MCU chip 140.

In one example, the second input terminal 1722 is connected to a resistor, and the resistor is connected to a voltage reference unit in the circuit, and a preset current value is input by selecting an appropriate resistor voltage divider. Of course, the preset current value may be input by adopting other techniques known to those skilled in the art.

In a case where the bus current is greater than or equal to the preset current value, the output terminal 1723 of the comparator 172 outputs a high level, and then the diode 173 is conductive; and the MCU chip 140 cuts off the driving signal output from the output terminals 1401 of the MCU chip 140 when the MCU chip 140 receives the conduction signal of the diode 173. In a case where the bus current is less than the preset current value, the output terminal 1723 of the comparator 172 outputs a low level, and then the diode 173 is cut off, and the MCU chip 140 properly works. In this way, the current detection circuit 170 detects whether or not the bus current is greater than or equal to the preset current value, so as to output the corresponding signal to the MCU chip 140; the driving signal from the output terminals 1401 of the MCU chip 140 is cut off when the bus current exceeds the preset current value; and the MCU chip 140 properly works when the bus current is less than the preset current value. The current detection circuit 170 has a simple structure, and the driving circuit 150 may be protected without a complicated external circuit.

Obviously, the present detection circuit may also be a voltage detection circuit. For example, the voltage detection circuit includes a voltage detection unit, a comparator and a diode. The difference between the voltage detection unit and the current detection unit is that the voltage detection unit is used to detect a bus voltage, a first input terminal of the comparator inputs the bus voltage, a second input terminal of the comparator inputs a preset voltage value, and the compactor, in condition that the bus voltage is greater than the preset voltage value, inputs a high level signal to conduct the diode.

It should be noted that the above solution may be adopted when the power tool has abnormalities such as overtemperature or undervoltage, and the detection circuit herein is a temperature detection circuit or a voltage detection circuit.

The basic principles, main features and advantages of the present disclosure have been shown and described above. It is to be understood by any person skilled in the art that the foregoing examples are not intended to limit the present disclosure in any form. All technical solutions obtained by equivalent substitution or equivalent transformation are within the scope of the present disclosure.

What is claimed is:

1. A power tool, comprising:
   a power supply module, configured for connecting to AC power;
   a brushless motor, comprising a rotor and a stator winding;
   a rectifier module, configured to receive the AC power from the power supply module and output a DC bus voltage;
   a position detection module, configured for detecting a position signal of the brushless motor;
   a MCU chip, configured to receive the position signal of the brushless motor detected by the position detection module and output a driving signal according to the position signal, wherein the MCU chip comprises a controller;
   a driving circuit, configured to receive the driving signal from the MCU chip to drive the brushless motor, wherein the driving circuit is connected in series between the MCU chip and the stator winding of the brushless motor; and
   a current detection circuit which is configured for detecting a bus current, wherein the controller is configured to, in condition that the bus current detected by the current detection circuit is greater than a preset current value, cut off the driving signal output by the MCU chip, and
   wherein the current detection circuit comprises a current detection unit, a comparator, and a diode; the current detection unit is configured for detecting the bus current; the comparator is configured to, in condition that the bus current detected by the current detection unit is greater than the preset current value, output a high level signal to the diode to conduct the diode; and the controller is configured to, in condition that the controller receives a conduction signal of the diode, cut off outputting of the driving signal.

2. The power tool according to claim 1, further comprising a Hall sensor which is configured for detecting a position of the rotor of the brushless motor, wherein the position detection module is electrically connected to the Hall sensor.

3. The power tool according to claim 1, wherein the position detection module is a back electromotive force detection module which is configured for detecting a back electromotive force of the brushless motor.

4. A power tool, comprising:
   an AC power plug, configured for connecting to an AC power input;
   a brushless motor, comprising a rotor and a stator winding;
   a rectifier module, wherein the rectifier module is electrically connected to the AC power plug, and is configured to convert the AC power input by the AC power plug into DC power for output;
   a back electromotive force detection module, wherein the back electromotive force detection module is electrically connected to the stator winding of the brushless motor, and is configured to detect a back electromotive force of the brushless motor;
   a driving circuit, wherein the driving circuit is electrically connected to the stator winding of the brushless motor, and is configured to drive the brushless motor, and the driving circuit has a plurality of driving input terminals;
   a MCU chip, wherein the MCU chip is connected between the back electromotive force detection module and the driving circuit, and is configured to output a driving signal to the driving circuit according to the back electromotive force detected by the back electromotive force detection module, and the MCU chip has a plurality of MCU output terminals which are electrically connected to the driving input terminals; and a current detection circuit, wherein the current detection circuit comprises a current detection unit, a comparator, and a diode, the current detection unit is configured for detecting a bus current, the comparator has a first input terminal, a second input terminal and an output terminal, the first input terminal is electrically connected to the current detection unit to input the bus current, the second input terminal is configured for inputting a preset current value, the output terminal is electrically connected to an anode of the diode, and a cathode of the diode is electrically connected to the MCU chip.

5. The power tool according to claim 4, further comprising a current detection circuit which is configured for detecting a bus current, wherein the MCU chip is configured to, in condition that the bus current detected by the current detection circuit is greater than a preset current value, cut off the driving signal output from the MCU output terminals.

6. The power tool according to claim 4, wherein the output terminal of the comparator is configured to, in condition that the bus current is greater than or equal to the preset current value, output a high level signal to conduct the diode; and the MCU chip is configured to, in condition that the MCU chip receives a conduction signal of the diode, cut off the driving signal output from the MCU output terminals.

7. The power tool according to claim 4, wherein the output terminal of the comparator is configured to, in condition that the bus current is less than the preset current value, output a low level signal to cut off the diode.

* * * * *